United States Patent Office 2,753,370
Patented July 3, 1956

---

2,753,370

ESTERS OF 4,7-DIHYDROXYSEBACIC ACID

Richard S. Urban, Philadelphia, Pa., assignor to Rohm & Haas Company, Philadelphia, Pa., a corporation of Delaware No Drawing. Application May 4, 1953,
Serial No. 352,999

3 Claims. (Cl. 260—484)

This invention relates to esters of 4,7-dihydroxysebacic acid having the formula

in which R is both occurrences represents a methyl, ethyl or propyl group.

These esters are made by the hydrogenation of the corresponding esters of 4,7-diketosebacic acid, these esters being known compounds (Kehrer et al., Berichte 28, 919 (1895) and Annalen 294, 171 (1896). Thus, the esters of the diketo acid, preferably in solution, can be hydrogenated in the presence of Raney nickel at a temperature up to 100° C.—preferably from about 15° C. to 50° C.—and at a pressure of 50 to 150 atmospheres. Alternatively, the diketo esters can be reduced to the dihydroxy esters successfully, albeit slowly, at about 30°–50° C. and at pressures as low as atmospheric pressure with hydrogen in the presence of platinum as a catalyst.

The following examples, in which all parts are by weight, illustrate the preparation of the compounds of this invention.

Example 1

A solution was made of 277 parts of the dimethyl ester of 4,7-diketosebacic acid in 500 parts of ethyl acetate and to this was added 1 part of platinum oxide. The mixture was stirred in an atmosphere of hydrogen at atmospheric pressure and at room temperature for 22 hours. The mixture was filtered and the filtrate was stripped of ethyl acetate under vacuum. The product was a waxy solid which melted below room temperature and was soluble in water and polar organic solvents. Its analysis showed that it was the dimethyl ester of 4,7-dihydroxysebacic acid.

Example 2

To a solution of 28.6 parts (.1 mole) of the diethyl ester of 4,7-diketosebacic acid in 1500 parts of ethanol was added 25 parts of Raney nickel. The mixture in an autoclave was treated at 30° C. with hydrogen at a pressure of 1000 lbs./sq. in. After two hours, the pressure had fallen by the theoretical amount. The mixture was filtered and the filtrate was stripped of ethanol under reduced pressure. A total of 22.3 parts of a viscous liquid was obtained which crystallized on standing to flat platelets which melted at 50°–53° C. The product was identified as the ethyl ester of 4,7-dihydroxysebacic acid.

On being heated to 170° C. the product was converted to 4,7-dihydroxysebacic acid bis-lactone.

In essentially the same way, the isopropyl ester of 4,7-dihydroxysebacic acid was prepared.

The esters of this invention are useful as plasticizers and for the preparation of resins, especially of the alkyl type, since they form resinous esters very readily on reaction by transesterification with polyhydric alcohols such as propylene glycol, glycerol and pentaerythritol.

I claim:

1. An ester having the formula

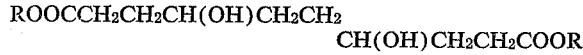

in which R in both occurrences is an alkyl group from the class consisting of methyl, ethyl and propyl groups.

2. A process of preparing an ester from the class consisting of the methyl, ethyl and propyl esters of 4,7-dihydroxysebacic acid which comprises reacting hydrogen, in the presence of a hydrogenation catalyst, with the corresponding ester of 4,7-diketosebacic acid while the latter is dissolved in an organic solvent.

3. The process of claim 2 in which the hydrogenation catalyst is Raney nickel, the temperature is from about 15° C. to about 50° C., and the pressure is from 50 to 150 atmospheres.

References Cited in the file of this patent

Beilstein: 4th ed. (1921), Band III, 845.
Goss et al.: J. Chem. Society, 1926, 1471–7.
Lukes: C. A. 43, 3792 (1949).